Sept. 13, 1955  I. A. GREENWOOD, JR  2,718,001

RADIO NAVIGATIONAL COURSE INDICATOR SYSTEM

Filed Feb. 18, 1946

INVENTOR.
IVAN A. GREENWOOD, JR.
BY
William D. Hall.
ATTORNEY

United States Patent Office 2,718,001
Patented Sept. 13, 1955

2,718,001

RADIO NAVIGATIONAL COURSE INDICATOR SYSTEM

Ivan A. Greenwood, Jr., Boston, Mass., assignor, by mesne assignments, to the United States of America as represented by the Secretary of the Air Force Application February 18, 1946, Serial No. 648,533

7 Claims. (Cl. 343—11)

This invention relates generally to electrical apparatus and more particularly to an indicating device for aiding the pilot of an aircraft to properly direct it along a chosen course.

It is frequently desirable to locate accurately the position of a moving aircraft with respect to a chosen ground target for the purpose of dropping bombs or other missiles thereon. One system devised for this purpose utilizes radio pulses from two beacon transmitters of known locations to determine the position of the aircraft and the time at which the aircraft has reached a previously chosen bomb-release point. More specifically, a directive beam of radio pulses is transmitted from the aircraft in such a manner that it periodically searches the ground area in the vicinity of the aircraft. When one of these radio pulses encounters one of the beacons, this beacon transmits a reply pulse which is received by the system in the aircraft and utilized to produce on the screen of a cathode ray tube or similar device an indication of the azimuth and range of the beacon relative to the aircraft. The distance of the bomb release point from each of the two beacons is determined beforehand, and by flying a circular course maintaining continuously the proper distance from the first beacon, the aircraft will reach the release point when the determined distance from the second beacon has been attained.

One common type of indicator is a Plan Position Indicator (PPI) in which the electron beam of the cathode ray tube is swept radially from the center of the tube face to the periphery, and this sweep is rotated about the central point in synchronism with the rotation of the directive antenna of the system. Pulses returned from reflecting objects or from beacon transmitters cause momentary intensifications of the electron beam. Thus a plane representation of the ground area surrounding the aircraft is produced on the indicator screen with the signals from reflecting objects and beacons in their approximate relative positions with respect to the aircraft, the position of which is represented by the center of the circular screen. Electronic markers may be produced on the screen at ranges equal to the respective ranges of the two beacons from the bomb-release point. The circular course about the first beacon mentioned above may be followed by causing the indication of this beacon to coincide with the corresponding range marker on the screen. The bomb-release point will have been reached when the indication of the second beacon coincides with its corresponding range mark.

Since following the required circular path necessitates a continual change in aircraft course, an observer stationed at the indicator must continually keep the pilot informed by some means as to the proper heading corrections to be made. With the apparatus thus far described this information is rather difficult to estimate. If the aircraft is following the circle properly, its direction of travel will continually be perpendicular to the radius of the desired circular path. A line passing through the aircraft and perpendicular to its path will thus intersect the beacon located at the center of the circle. A linear electronic marker on the indicator screen which is perpendicular to the direction of travel of the aircraft aids in determining the proper aircraft heading, which is indicated when the marker continually intersects the first beacon indication. It is merely necessary for the operator to estimate the angular distance between this mark and the beacon indication and to transmit this information to the pilot.

Radio means have been devised for determining the direction of travel of an aircraft relative to the ground. This direction of travel is usually not the same as the heading of the aircraft due to the action of the wind in deflecting it from its path. The angle between the heading of the aircraft and its ground track or direction of travel relative to the ground is known as drift angle. If two ground points are chosen at different angular directions relative to the ground track of an aircraft, it can be shown geometrically that the aircraft approaches these points at different rates. Further for a given position of the aircraft, if these points are separated by a predetermined difference in angular direction, the difference in the respective velocities of approach to these points varies directly as the mean angular displacement of these points from the direction of the ground track.

Due to the finite width of the directive beam of the antenna an echo pulse received at a given instant may be a combination of a large number of echo signals from points at equal ranges but at slightly different azimuths. The phase of the radio frequency oscillations making up each of these signals is varying at a rate dependent upon the velocity of the aircraft relative to the point returning the echo. Since these velocities are not equal, as stated above, the phase variation occurs at a different rate for each of these points, and hence a resulting amplitude modulation of the echo pulses is produced. The frequency of this modulation varies directly as the difference in respective velocities of approach and therefore varies directly as the angular displacement of the direction of the antenna beam from the ground track of the aircraft. By an observation of this modulation frequency, which is low enough to be observed visually, the direction of the ground track of the aircraft may be determined and the drift angle measured.

Once the ground track and drift angle have been determined, various means may be utilized for producing on the PPI indicator a marker which is perpendicular to the ground track, for example, the means to be hereinafter described. Other means must then be utilized for indicating to the pilot the displacement of this perpendicular-to-ground-track marker from the beacon indication on the cathode ray tube screen, so that he may make appropriate corrections. This means may be called a pilot's direction indicator or PDI. Occasionally the beacon reply pulse may temporarily fade from the indicator, due to unfavorable reception conditions. In this case it is convenient to cause the PDI to indicate continuously whether or not the beacon indication is present on the screen at all times. Small erratic variations in the heading of the aircraft may occur due to atmospheric turbulence or other effects, which would temporarily displace the beacon indication on the screen. These variations are known as yawing. To obviate the necessity for the observer to follow these variations closely with a manual control, some means should be provided which will automatically indicate the direction and magnitude of yawing to the pilot and at the same time enable the perpendicular-to-ground-track marker to remain on the beacon indication.

It is therefore an object of the present invention to provide a direction-indicating device which will enable a pilot conveniently to direct an aircraft upon a circular course around a fixed ground point, which is a source of transmitted or reflected radio pulses. It is a further object of the invention to render the PDI independent of temporary fading of the radio signal from the fixed point. It is another object to provide means to cause this PDI to indicate automatically yawing of the aircraft.

Other objects, features and advantages of this invention will suggest themselves to those skilled in the art and will become apparent from the following description of the invention taken in connection with the accompanying drawing in which.

Figure 1:
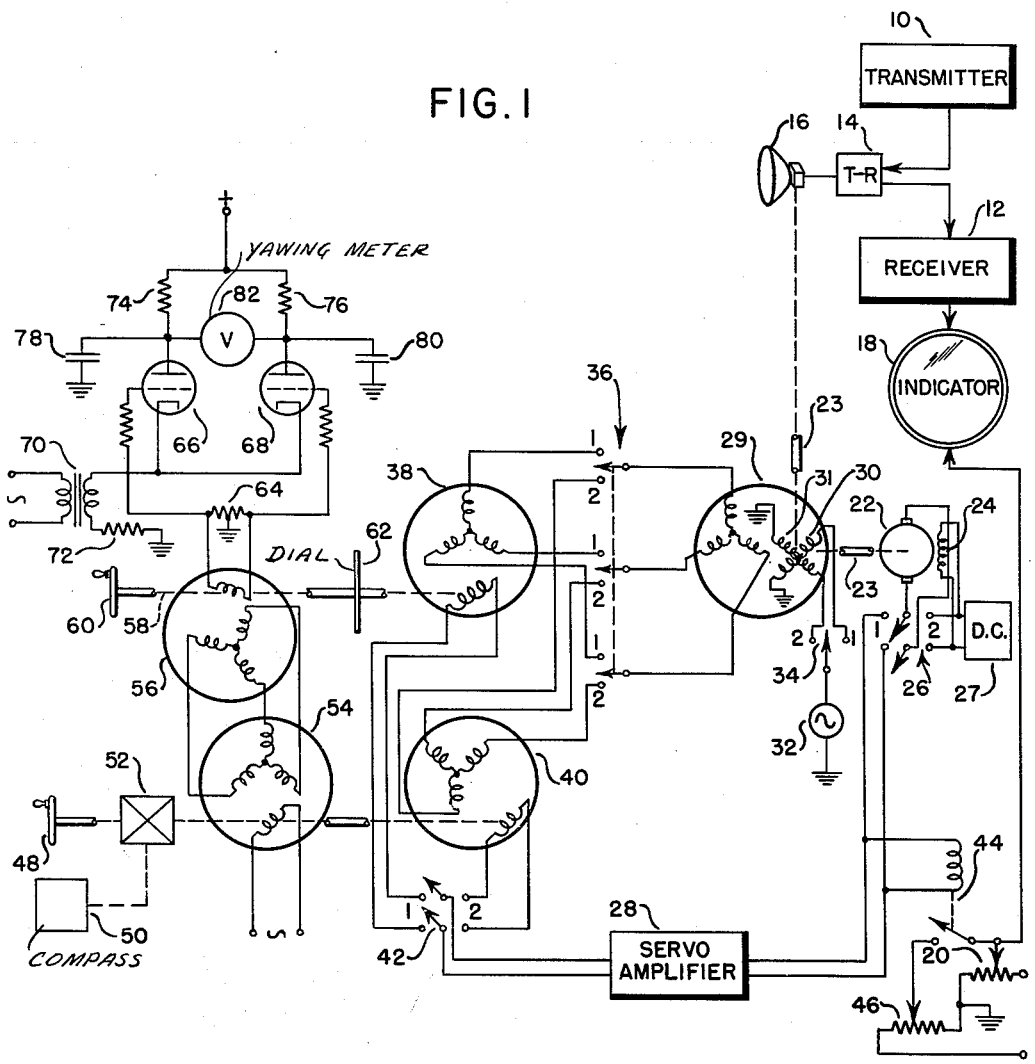
Fig. 1 is a circuit diagram showing one embodiment of the invention.

Reference is made now more particularly to Fig. 1 in which a radio pulse transmitter 10 and a radio pulse receiver 12 are connected through a duplexing device 14 to a directional antenna 16. Duplexing device 14 may be any transmit-receive switch or similar device which will protect the receiver from overload during transmitted pulses, and also prevent received pulses from being dissipated in the transmitter during the periods between transmitted pulses. Antenna 16 may be a dipole with a parabolic reflector or any similar antenna radiating a beam narrow in azimuth and fairly wide in a vertical plane. Both of these types of devices are well known in the art.

The output video pulses from receiver 12 are applied to indicator 18 which may be of the PPI type described above. For a PPI type of indicator these signals may be applied to the control grid of the cathode ray tube. A D.-C. input voltage which may be applied to either the control grid or the accelerating anode of the cathode ray tube is obtained from the variable tap of potentiometer 20 across which is applied a direct voltage.

Antenna 16 is mechanically rotated by a D.-C. motor 22 to which it is coupled through a shaft 23. Motor 22 includes a field coil 24 to which a direct voltage of fixed polarity is applied from a D.-C. source 27. The direction of rotation of motor 22 may be reversed by reversing the polarity of the voltage applied to its armature. By means of a double-pole double-throw switch 26, this voltage may be obtained either from direct-current source 27 or from the output of a servo-amplifier 28. Amplifier 28 may be any servo-amplifier capable of producing a D.-C. output of sufficient magnitude to drive motor 22, the magnitude and polarity of this voltage being determined by the magnitude and polarity of an A.-C. input signal. Many such amplifiers are well known in the art. Shaft 23 is also coupled to the rotor of an angular motion repeating device 29 having the usual three stator coils and two mutually perpendicular rotor coils 30 and 31. The voltage from an A.-C. source 32 may be selectively applied by means of a switch 34 to either of these rotor coils.

The three stator coils of the device 29 may be respectively connected by means of a triple-pole double-throw switch 36 to either the three stator coils of a second repeating device 38 or the stator coils of a third device 40. The rotors of repeaters 38 and 40 each include only a single coil, the terminals of either of which may be connected by means of a double-pole double-throw switch 42 to the input of servo-amplifier 28. The output stage of the amplifier 28 is connected to the coil of a relay 44 as well as to switch 26 previously described. Relay 44 is arranged so as to make and break a connection between the variable tap of a potentiometer 46 and the variable tap of potentiometer 20. A direct voltage is applied across potentiometer 46.

The rotations of a handwheel 48 and a compass 50 are both transmitted by a differential 52 to the rotor of a repeater 54, which is further coupled directly to the rotor of repeater device 40 with which it is identical. The rotor of device 54 may be excited by an A.-C. voltage which may be furnished by source 32. The stator coils of repeater 54 are respectively connected to the stator coils of repeater 56, while the rotor of repeater 56 is mechanically connected by means of a shaft 58 to the rotor of repeater device 38 and a handwheel 60. Drift dial 62 is mounted on shaft 58 so as to indicate the angular position thereof.

A resistor 64 having a ground connection at its midpoint is connected in parallel with the rotor coil of repeater 56. The end terminals of the rotor coil of repeater 56 are respectively connected through resistors to the grids of two triodes 66 and 68 which form a phase detector. The cathodes of these triodes are jointly coupled to a source of A.-C. voltage by means of a transformer 70 and returned to ground through a resistor 72. The primary voltage for transformer 70 should be in phase with that supplied to the rotor of repeater 54. The plates of triodes 66 and 68 are respectively connected through load resistors 74 and 76 to a source of a positive voltage and bypassed to ground for A.-C. voltages of the input frequency by capacitors 78 and 80 respectively. The PDI proper consists of a D.-C. voltmeter 82 which will read either positive or negative voltages by deflecting to either side of its center-scale zero position and which is connected between the plates of triodes 66 and 68. Other phase sensitive detectors, many of which are common in the art, may be substituted for that comprising triodes 66 and 68 with their associated circuits.

In explaining the operation of the system let it first be assumed that the target has been selected and that its respective distances from the two beacon transmitters have been determined. The aircraft is in flight and should follow the circular course around the first beacon at a range which will enable it to reach a proper bomb-release point. The aircraft may be directed toward this beacon until it reaches the proper range.

The ground track of the aircraft must now be determined. As the first step in this procedure, switches 26, 34, 36 and 42 are set in the position marked 1 in the diagram of Fig. 1. An alternating current is then caused to flow in the rotor coil 30 of repeater device 29, thus setting up a magnetic field within the repeater. Due to the interconnection between the stator coils of repeaters 29 and 38, a similar field is set up in the latter synchro, the direction of both fields being determined by the position of coil 30.

A voltage is induced in the rotor coil of repeater 38 which is applied to servo amplifier 28. The D.-C. output of this amplifier drives motor 22, which in turn rotates coil 30 and antenna 16. The direction of motion is such as to cause the magnetic field in synchro 38 to become perpendicular to the rotor coil thereof. When this condition has been attained, the voltage induced in this coil is zero and the motor 22 stops. Thus the position of antenna 16 may be controlled by the position of handwheel 60. This type of servo action is well known in the art. Radio pulses are emitted by transmitter 10 through antenna 16 and echo pulses from ground objects are observed on indicator 18. Antenna 16 is rotated until minimum echo modulation frequency is observed, at which time it is pointing in the direction of the ground track of the aircraft. Drift dial 62 then indicates the magnitude of the drift angle.

Switches 26 and 34 may then be thrown to position 2. Motor 22 then rotates antenna 16 continuously. Coil 31 is now excited, however, rather than coil 30, and the input to amplifier 28 becomes zero each time antenna 16 is directed in a position perpendicular to that indicated by the position of dial 62. When the amplifier input and output reach zero, no current flows in the coil of relay 44, and its contact arm closes, connecting together the variable taps of potentiometers 20 and 46.

If the variable tap of potentiometer 46 is set at a higher potential than that of potentiometer 20, the voltage applied to the indicator 18 will be increased by a corresponding amount with no interruption of the voltage during the switching period. The original voltage applied to the indicator 18 and the amount of change produced by the switching may be adjusted by varying the position of the movable taps of potentiometers 20 and 46, respectively. This change of voltage at the time the output of amplifier 28 reaches zero causes the trace on the cathode ray tube screen to be intensified at this time, and since the trace is rotated in synchronism with the antenna, a marker is produced on the screen in a position perpendicular to the previously determined ground track of the aircraft.

The pilot may then be instructed to direct his aircraft so that the marker is caused to intersect the indication of the first beacon on the screen. In making the required change in heading it should be noted that the drift angle changes from its previously determined value, since the wind now has a different direction relative to the aircraft heading. Hence the aircraft will still not be exactly on the desired course, since the position of the perpendicular-to-ground-track marker depends upon the previously made determination of ground track and drift angle. The desired initial condition is established to a sufficient degree of accuracy, however, since any further corrections will be small enough that the drift angle will not be appreciably altered thereby. A determination of the new drift angle may now be made in the same way as before by throwing switches 26 and 34 back to position 1.

Figure 2:
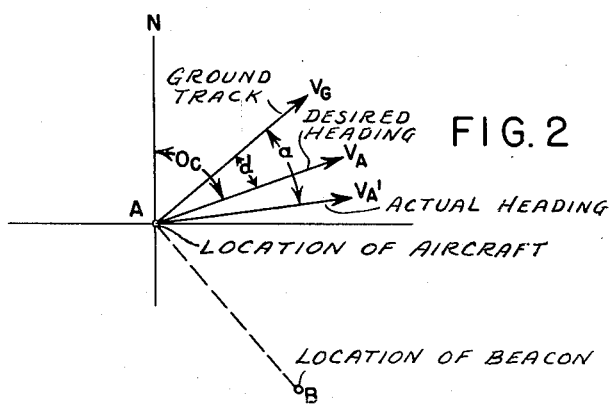
Fig. 2 is a diagram showing the geometry involved in the understanding of the invention.

The prevailing conditions may be more clearly seen by reference to Fig. 2, which illustrates a typical operational problem. The aircraft is located at point A, while the first beacon is at B. The desired ground track of the aircraft is in the direction of vector $V_g$. The desired heading of the aircraft is then in the direction of $V_a$, which is displaced from $V_g$ by an angle $d$ equal to the drift angle. The actual heading of the aircraft is in the direction of vector $V_a'$, which differs in position from $V_g$ by an angle $a$ due to the previously mentioned change of drift angle. The angle $\theta_c$ is the desired azimuth of the aircraft heading with respect to north. $V_a'$ must be made to coincide with $V_a$, or angle $a$ must equal angle $d$.

Switches 26, 34, 36 and 42 of Fig. 1 are now thrown to position 2. Repeater device 40 effectively replaces repeater 38, and the antenna rotates continuously as before. A marker is again produced on the cathode ray tube screen, but its position is controlled in this instance by the position of the rotor of device 40. By turning handwheel 48, the marker is made to intersect the beacon indication on the screen. Since the aircraft is not exactly on the desired course, the position of the rotor of repeater 40 is not the same as that of the rotor of repeater 38. The field set up in repeater 54 is, in effect, transmitted to a repeater 56 by the stator connections between the two, and the rotors of the various repeaters are so arranged with respect to the mechanical coupling shafts that when the rotors of repeaters 38 and 40 are in corresponding positions, the rotors of repeaters 54 and 56 are in mutually perpendicular positions. In this case no voltage is induced in the rotor coil of repeater 56.

Figure 3:
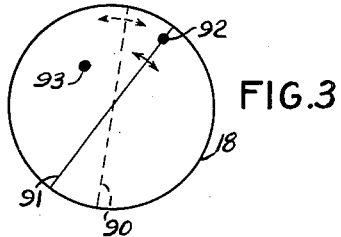
Fig. 3 shows the indications on the screen of the PPI indicator.

Fig. 3 shows the indications which are obtained on the screen of PPI Indicator 18. Spots 92 and 93 represent the respective positions of the first and second beacons. Movable marker 91 is obtained when switch 42 is in position 1 and switches 26 and 34 are in position 2, and movable marker 90 is obtained when all switches are in position 2. Fig. 3 shows only marker 91 adjusted to intersect beacon spot 92.

When the aircraft is not on the required course, however, a voltage is induced in the rotor of repeater 56, since this rotor is displaced from the above mentioned position with respect to the rotor of repeater 54 by placing the marker so that it intersects the beacon indication. The polarity and magnitude of this voltage are determined by the direction and magnitude, respectively, of the error in heading. The voltages applied to the grids of triodes 66 and 68 are in push-pull phase relation due to the connection of the center tap to ground on resistor 64. Since the voltage applied to the cathodes of these triodes through transformer 70 is synchronized with the voltage applied to repeater 54, it is in phase with one grid voltage and out of phase with the other. The polarity of the voltage induced in the rotor of repeater 56 determines which of the triodes has its two input voltage in phase. The resultant input voltage in this triode is less than that in the other, since the A.-C. voltages on the cathode and grid at least partly counteract each other. The triodes are biased by means of cathode resistor 72 so as to operate over the non-linear portions of their respective characteristic curves. The average plate voltages of the two triodes thus differ by an amount corresponding to the differences in their input voltages, and the magnitude and polarity of this difference is measured by meter 82. As can be seen, this magnitude and polarity are determined by the error in heading. By a suitable calibration, meter 82 may be made to indicate directly the heading error in degrees.

When the pilot observes the heading error as indicated on meter 82, he make a suitable correction in course. As the heading of the aircraft changes, a torque supplied by compass 50 through differential 52 to the rotor of repeater 54 causes the marker to remain on the beacon indication, while at the same time reducing the voltage supplied to the grids of triodes 66 and 68 until the correct heading has been attained, at which time the meter should indicate zero. It may readily be seen that this compass action also occurs when yawing takes place, maintaining the coincidence of the marker with the beacon indication. The magnitude and direction of yawing is thus also indicated automatically on the PDI meter 82.

If only a relatively small portion of the circular path is to be followed before reaching the bomb release point, the drift angle will not be changed appreciably, unless a change in wind velocity occurs. Occasional redetermination of drift angle may be made during the course of the approach to allow for wind variations. Similarly, if a fairly large portion of the circular path is to be followed, redeterminations of the drift angle should also be made from time to time.

Other methods may be substituted for the signal-modulation method of determining drift angle as described above. For example, the air velocity of the aircraft, as determined from any of the well-known airspeed indicators in conjunction with a compass, may be combined vectorially with the wind velocity, as determined from meteorological data, to obtain the ground velocity of the aircraft. The angular difference between the direction of heading of the aircraft and the direction of its ground velocity will be the drift angle. The value of drift angle determined in this way may be set on drift dial 62 by turning handwheel 60, and the operation of the system may in other respects duplicate that given above.

The PDI system as described may conveniently be used in conjunction with some means of indicating lateral displacements from the circular course. This information may be obtained by noting the range of the first beacon from the aircraft as shown on the PPI and comparing it with the desired range as determined by the required circular course. The difference in these values may then be translated into a voltage, by means of a device such as a potentiometer, and applied to a voltmeter to give a visible indication of lateral displacement.

It will be obvious that other means such as potentiometers may be used in place of the synchros described above for transmitting angular position data. The output voltages of the potentiometers may be made to correspond in magnitude and polarity to the angular position to be indicated and a meter may be used to make any desired comparison between the magnitudes of the various voltages in order to obtain a direction indication.

While there has been described what is at present considered to be the preferred embodiment of this invention, it will be obvious to those skilled in the art that various changes and modifications may be made therein without departing from the scope of the invention.

The invention claimed is:

1. In combination, means including a directive antenna for transmitting electromagnetic pulses from an aircraft in flight, indicating means, means for receiving electromagnetic pulses and utilizing them in conjunction with said indicating means to produce indications of the positions of their respective points of origin or reflection relative to said aircraft, a first angular motion repeating device having two mutually perpendicular rotor coils, said perpendicular rotor coils being mechanically coupled to said directive antenna so as to rotate in synchronism therewith, a source of alternating voltage, a single-pole double-throw switch disposed intermediate said first repeating device and said source of alternating voltage in such a manner that said source of alternating voltage may be connected selectively to each of said perpendicular rotor coils, a second angular motion repeating device, a third repeating device, a triple-pole double-throw switch for coupling said first, second and third repeating devices in such a manner that the stator coils of said first repeating device may be respectively connected to the stator coils of said second and third repeating devices selectively, a repeating device signal amplifier for receiving an alternating input voltage from said second and third devices and for producing therefrom a direct output voltage the magnitude and polarity of which are determined respectively by the magnitude and phase of said alternating input voltage, a first double-pole double-throw switch for coupling said second and third repeating devices and said repeating signal amplifier in such a manner that the rotor coils of said second and said third repeating devices may be selectively connected to the input of said repeating signal amplifier, a motor arranged so as to rotate said antenna, a source of direct voltage connected to the field coil of said motor, a second double-pole double-throw switch for coupling said motor and said source of direct voltage and said repeating signal amplifier in such a manner that the armature of said motor may be connected selectively to the output of said repeating signal amplifier and to said source of direct voltage, first and second potentiometers having connections to a source of direct voltages, a relay having its coil connected to the output of said repeating signal amplifier and arranged so as to make and break a connection between the variable taps of said first and second potentiometers, said first potentiometer having its variable tap connected to one of the electrodes of said indicating means, a fourth repeating device having its rotor mechanically coupled to that of said third repeating device, the coil of said rotor of said fourth repeating device having a connection to a source of alternating voltage, a first handwheel, a compass, a differential mechanically coupled to said first handwheel and to said compass and said rotor of said fourth repeating device, a fifth repeating device having its stator coils respectively connected to the stator coils of said fourth repeating device, a second handwheel, an indicating dial, a mechanical coupling interconnecting said second handwheel with said indicating dial and the rotors of said second and fifth repeating devices, an electronic phase detector connected to said fifth repeating device to receive a first alternating input voltage therefrom and connected to a source of a second alternating voltage to produce a direct voltage indicative of the magnitude of one of said two input voltages and the phase relation thereof to the other of said two input voltages, and means for indicating the magnitude and polarity of said direct voltage.

2. In combination, means including a rotatable directive antenna for transmitting electromagnetic pulses from an aircraft, indicating means, means for receiving electromagnetic pulses and utilizing them in conjunction with said indicating means to produce indications of the positions of their respective points of origin or reflection relative to said aircraft, means for placing on said indicating means a first marker indicative of a first given direction with respect to the ground track of the aircraft and for varying the position of said first marker, means for placing on said indicating means a second marker indicative of a second given direction related to the actual heading of the aircraft and for varying the position thereof both manually and automatically in response to changes in the heading of said aircraft, and means for indicating visually the direction and magnitude of the difference in position of said first and second markers on said indicator.

3. In combination with a radio object-locating system in an aircraft, said system including an indicator, means for producing on said indicator a first marker corresponding to an azimuthal direction perpendicular to the ground track of the aircraft, means for producing on said indicator a second marker corresponding to another azimuthal direction the position of which may be varied, and means for indicating the angular displacement between said first and second markers.

4. A radio direction indicating system for an aircraft, comprising first means for effecting an azimuthal scan of a directive source of electro-magnetic pulse energy, second means synchronized with said first means for receiving and indicating electro-magnetic pulses to produce indications of the azimuthal positions of their respective points of origin and reflection relative to the aircraft, third means coupled with said first means for determining an azimuthal position of said scan effecting means corresponding to the ground track of said aircraft, fourth means for producing a first marker on said indicating means indicative of the azimuth of a line perpendicular to the ground path of said aircraft, fifth means connectable to said indicating means for producing a second marker on said indicating means corresponding to the azimuth of the heading of said aircraft, sixth means coupled to said fourth and fifth means for deriving a signal corresponding to the difference in direction between said first and said second markers, and seventh means connected to be energized from said last-named means to provide an indication corresponding to said difference in direction.

5. The system according to claim 4, including means for initially selectively positioning said scan effecting means.

6. The system according to claim 4, wherein said second marker producing means includes means for adjusting the directive position of said second marker.

7. The system according to claim 6, wherein said adjusting means comprises a navigational compass.

References Cited in the file of this patent

UNITED STATES PATENTS

| | | |
|---|---|---|
| 2,405,231 | Newhouse | Aug. 6, 1946 |
| 2,405,238 | Seeley | Aug. 6, 1946 |
| 2,414,323 | Moe | Jan. 14, 1947 |
| 2,419,205 | Feldman | Apr. 22, 1947 |
| 2,419,239 | White | Apr. 22, 1947 |
| 2,419,541 | De Rosa | Apr. 29, 1947 |
| 2,422,697 | Meacham | June 24, 1947 |
| 2,459,481 | Wolff | Jan. 18, 1949 |
| 2,528,202 | Wolff | Oct. 31, 1950 |
| 2,597,349 | Longmire | May 20, 1952 |